Figure 1:
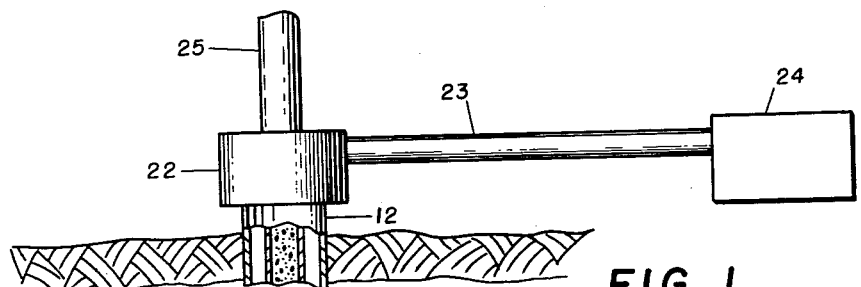
Figure 1:
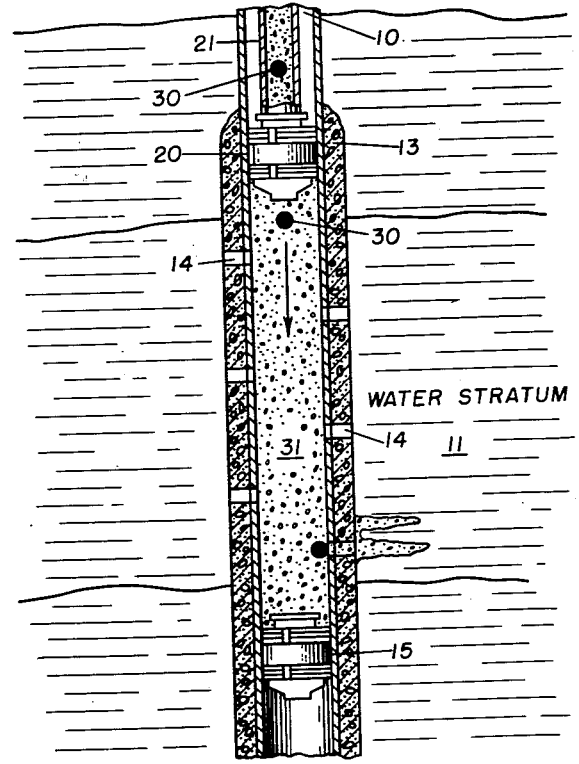

Nov. 28, 1961 D. M. FOX 3,010,514
OIL WELL CEMENTING
Filed Oct. 9, 1957

DEAN M. FOX
INVENTOR.

BY Sidney A. Johnson
ATTORNEY

United States Patent Office 3,010,514
Patented Nov. 28, 1961

3,010,514
OIL WELL CEMENTING
Dean M. Fox, Billings, Mont., assignor, by mesne assignments, to Socony Mobil Oil Company, Inc., New York, N.Y., a corporation of New York
Filed Oct. 9, 1957, Ser. No. 689,225
12 Claims. (Cl. 166—21)

This invention relates to oil well cementing and more specifically relates to selective squeeze cementing of oil wells.

Cementing of casing in oil wells is basically the process of displacing a cement slurry downwardly through the casing, out around the lower end of the casing, and upwardly in the annular space behind the casing. The cement is allowed to set in the annular space to bond the casing to the earth formations and to close off permeable formations penetrated by the well bore. The initial cementing of the casing as described above is frequently referred to as primary cementing.

Often primary cementing is ineffective in correcting numerous problems which affect a producing oil well. Failures in primary cementing necessitate resorting to what may be referred to as secondary cementing, which includes the process of squeeze cementing. Squeeze cementing is a method in which cement slurry is forced, or "squeezed," by pressure into or against a permeable formation, or through perforations in casings or liners at predetermined locations, for the purpose of correcting such problems as the following: high gas-oil ratio; excessive water; repair of casing leaks or perforations improperly placed; isolation of producing zones prior to perforating for production; channeling and insufficient cement on the primary job; low pressure formations that are thieving oil, gas, or drilling fluids; and abandonment of depleted producing zones to prevent fluid migration and contamination of other zones.

In one form of squeeze cementing through perforations in the casing or liner, a bridge plug is placed in the casing below the perforations, and a cement retainer connected to the lower end of the tubing or drill pipe is positioned in the casing above the perforations. The bridge plug and cement retainer are forms of packers which provide a packed-off section spanning the perforations through which the cement slurry is to be forced. In case the perforations are located near the bottom of a well, only the cement retainer is used, with the bottom of the well serving the function of the bridge plug. Cement slurry is pumped downwardly through the tubing and cement retainer into the casing or liner and outwardly through the perforations into the formation. In the presently known methods of squeeze cementing, there is no way, except by the inclusion of formation bridging agents in the slurry, of preventing the more permeable or fractured zones from taking the majority of cement slurry, causing some perforations to receive no slurry. Also, the known methods of squeeze cementing frequently require staging, that is, stopping pumping to permit the slurry to partially set. Further, present methods of squeeze cementing sometimes require pressures which necessitate the use of expensive high pressure equipment and which may result in damage to the casing or liner.

It is an object of the present invention to provide a method of squeeze cementing through perforations in a casing or liner in which approximately equal, predetermined quantities of cement are directed downwardly through the casing to the perforations for the purpose of effecting substantially uniform distribution of the cement through the casing along the perforated portion thereof. It is another object of the invention to provide a method of squeeze cementing which does not require staging of the cement slurry. It is another object of the invention to provide a method of squeeze cementing which employs relatively low pressure pumping equipment. It is another object of the invention to provide a method of squeeze cementing in which the pump pressure employed will not endanger the casing or liner. These and further objects of the invention will be apparent from the drawings and the following specification and claims.

The present invention is a method of squeeze cementing employing perforation plugging elements disposed in cement slurry to direct a plurality of substantially uniform unit quantities of cement slurry to the perforations in a casing or liner in an oil well. The method of the invention is carried out by injecting ball-shaped elements into cement slurry at predetermined intervals as the slurry is pumped into an oil well. Each of the balls arrives at a perforation and closes off the perforation after a quantity of slurry has passed through the perforation, thus preventing an excessive amount of slurry from passing through any one perforation at the expense of another perforation.

Figure 2:
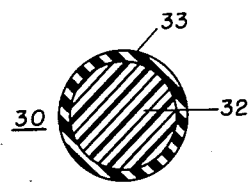

In the drawings, FIG. 1 is a diagrammatic view partially in section showing a perforated casing in an oil well bore and one form of equipment which may be used in carrying out the invention; and FIG. 2 is a sectional view of one form of ball which may be used to carry out the invention.

Referring to FIG. 1, an oil well bore 10 extends downwardly into the earth through various types of earth formations, including a water stratum 11 containing fissures. A casing 12 is set in the well bore extending from the surface to the bottom of the well. Cement 13 is positioned behind the casing extending from the bottom of the well preferably to the surface. Casing 12 is provided with perforations 14 along the length of the casing adjacent to water stratum 11. The perforation of the casing may be done by any of several well-known methods which will provide substantially round holes through the casing. Examples of apparatus which may be used in making the perforations in the casing are guns which employ either bullets or the jet principle. A bridge plug 15 is set in the casing below perforations 14, and a cement retainer or packer 20 is set in the casing above the perforations and connected to tubing 21. In the embodiment illustrated, bridge plug 15 and cement retainer 20 are of the drillable type, that is, they may be drilled from the casing following cementing. The cement retainer and bridge plug are set in the casing by methods well-known to those skilled in the art. Cementers and bridge plugs of the retrievable type may be used as illustrated at pages 582–585 in the 22nd edition of the Composite Catalog of Oil Field Equipment and Services, 1957, published by Gulf Publishing Company, Houston, Texas. It will be recognized that many other types of cementers and bridge plugs which are well-known in the art may be employed. Also, it will be recognized that other combinations of packers may be employed, depending upon the conditions in the well. If the perforations to be squeezed are sufficiently close to the bottom of the well, it may be necessary to use only a cement retainer above the perforations with the lower end of the well serving the function of the bridge plug.

A casing head 22 is connected to casing 12 and tubing 21 at the top of the well. A cement supply pipe 23 is connected between cement pump 24 and casing head 22. Line 25, leading from a lubricator, not shown, is secured to casing head 22 to permit the introduction of balls 30 into the tubing. Though the ball injection means has been defined as a lubricator, it is not intended that the equipment employed to introduce the balls into the tubing 21 be so limited. Any apparatus adapted to introduce balls into a conduit may be used in lieu of a lubricator. Also, the apparatus used to introduce the balls may be connected into supply pipe 23 rather than casing head 22.

Balls 30 are shown disposed in cement slurry 31. FIG. 2 illustrates a preferred form of ball which may be employed in carrying out the invention.

Referring to FIG. 2, ball 30 comprises a nylon core 32 provided with a rubber covering 33. It may be necessary to add weight to the nylon core to obtain a ball of the desired density, depending upon the density of the cement slurry to be used. This may be done by forming the nylon core around a lead shot or adding metal particles to the nylon in making the core. Balls 30 may also be constructed from other materials such as a drillable metal. Balls 30 must be of sufficient size and the material of which they are made of sufficient hardness that they will not be extruded through the perforations during the cementing operation. The density of the balls should be in the range from 1.0 to 1.2 times the density of the cement slurry in which they are used in order that they will maintain their relative position in the cement slurry and will not float upwardly in the slurry.

The term "cement slurry" as used herein is intended to include any slurry of material which may be pumped through the perforations in a casing to a position behind the casing and into a formation to be sealed and which, when in position, will set to a sufficient hardness to accomplish the desired objectives of a cementing operation. The terminology "cement slurry" is intended to include hydraulic cements and plastics. Hydraulic cements include such cements as Portland, either of the normal type or the slow-setting type. Hydraulic cements also include mixtures of lime, silica, and alumina, or of lime and magnesia, silica, and alumina and iron oxide (magnesia, for example, may replace part of the lime, and iron oxide may replace part of the alumina). The term "hydraulic cements" further includes hydraulic limes, grappier cements, pozzolan cements, and natural cements. Pozzolan cements include slag cements made from slaked lime and granulated blast furnace slag. Included in the plastics which may be employed are thermosetting plastics such as a resinous material of the phenol-formaldehyde type. Other thermosetting plastics such as urea-formaldehyde and melamine-formaldehyde types may be used as a cementing material in lieu of hydraulic cement.

The method of the invention is carried out in the following manner. Cement slurry is pumped into line 23 by pump 24 to the point of connection of line 25. Pumping is continued until a predetermined amount of cement slurry has flowed past line 25, at which time the first of balls 30 is introduced into the stream of slurry through the line. The flow of slurry is continued and balls 30 are introduced serially at predetermined intervals. The slurry containing the balls is pumped downwardly through tubing 21 and out of the tubing through cement retainer 20 into casing 12 from which it flows into stratum 11 through perforations 14. The approximately equal quantities of cement which are separated by the balls 30 are distributed substantially equally through the perforations to which the cement slurry is directed. As the last portion of each of the predetermined quantities of cement passes through a perforation, the ball preceding that quantity of cement seats on the perforation and closes it off, functioning in substantially the same manner as a ball check valve. The ball is held against the perforation by the pressure of the slurry within the casing. As the pumping of the cement slurry containing the balls continues, approximately all of the perforations receive substantially equal quantities of the cement and are closed by a ball, resulting in the deposition of the substantially uniform sheath of cement behind the perforated portion of the casing. Thus, the amount of cement required to seal water stratum 11 is distributed substantially equally through the perforations 14. In the absence of the balls, substantially all of the slurry frequently would flow through those perforations leading to the most permeable or fractured portions of a formation, resulting in the perforations adjacent to the less permeable portions of the formation receiving an inadequate amount of cement. The action of the balls prevents the slurry from all flowing through those perforations which normally would preferentially take it.

The interval between the introduction of each of balls 30 is determined by the quantity of cement slurry which it is believed should be directed toward each of the perforations in a casing. For example, if amounts of cement slurry in equal quantitative increments mixed from 2 sacks of cement are to be directed toward the casing perforations, a ball will be introduced into the stream of slurry as each increment of 2 sacks of cement is pumped into the well. The methods of determining the quantity of cement required are well-known to those skilled in the art. For example, the amount of cement needed may sometimes be estimated from a rate and pressure test. In preparing a formation for squeeze cementing, a quantity of water is pumped into the well and out through the perforations into the formation for the purpose of breaking down the resistance of the formation. Initially, there will be observed a maximum pressure due to the resistance of the formation. After the resistance of the formation has given way, the pressure will decline until a steady minimum pressure is reached. The quantity of cement required may be estimated by the differential between the initial breakdown or maximum pressure and the minimum pressure reached and by the volume of water pumped into the formation to attain the minimum pressure.

After the cement slurry has been forced through the perforations into the formation to be cemented, the slurry may be sufficiently fluid that it must be retained within the formation until it has set therein. The slurry may be retained within the formation by maintaining sufficient fluid pressure within the casing to hold the balls against the perforations. If after the cementing is completed, that is, after the perforations have received the desired amount of slurry and have been closed off by the balls, excess cement remains in the casing, it may be disposed of by slightly relieving the pressure on the slurry to drop some of the balls away from the perforations and forcing the remaining slurry into them. However, the most practical and desirable process in the case of excess cement remaining in the casing would be to permit it to set and drill it out during the normal drill-out operation.

While the invention has been described in connection with certain specific embodiments thereof, it will be understood that further modifications will suggest themselves to those skilled in the art, and it is intended to cover such modifications as fall within the scope of the appended claims.

What is claimed is:

1. A method of selective squeeze cementing through perforations in a casing set in the bore of an oil well comprising: initiating flow of cement slurry under pressure to said casing; introducing perforation plugging elements at predetermined selected intervals into said cement slurry to provide at least one perforation plugging element following each increment quantity of said cement slurry being introduced into said casing; pumping said cement slurry and said plugging elements downwardly through said casing; and forcing said cement slurry outwardly through said perforations until said perforations are closed by said plugging elements.

2. The method of claim 1 in which said perforation plugging elements are formed in the shape of balls.

3. The method of claim 1 in which said perforation plugging elements are balls having a density ranging from 1.0 to 1.2 times the density of the cement slurry.

4. The method of claim 1 in which said perforation plugging elements are rubber covered nylon balls having a density ranging from 1.0 to 1.2 times the density of the cement slurry.

5. In an oil well provided with casing having a plurality of substantially round perforations spaced along a defined length of said casing, a method of directing substantially equal predetermined amounts of cement slurry through said casing toward said perforations which comprises: initiating flow of cement slurry under pressure to said casing; introducing perforation plugging elements serially into said cement slurry at predetermined selected intervals to provide a predetermined amount of cement slurry ahead of each of said plugging elements; pumping said cement slurry and plugging elements downwardly through said casing; forcing said cement slurry through said perforations; and forcing said plugging elements into sealed relationship with said perforations.

6. The method of claim 5 in which said perforation plugging elements are formed in the shape of balls.

7. The method of claim 5 in which said perforation plugging elements are balls having a density ranging from 1.0 to 1.2 times the density of the cement slurry.

8. The method of claim 5 in which said perforation plugging elements are rubber covered nylon balls having a density ranging from 1.0 to 1.2 times the density of the cement slurry.

9. In an oil well having a casing provided with a plurality of substantially round perforations spaced along a defined length of said casing, a method of directing substantially equal predetermined amounts of cement slurry downwardly through said casing toward said perforations which comprises: flowing cement slurry under pressure into said casing; introducing perforation plugging elements into said cement slurry at predetermined selected intervals to provide a predetermined amount of cement slurry in advance of each of said plugging elements; forcing said cement slurry and said plugging elements downwardly in said casing; forcing said cement slurry through said perforations until said plugging elements are seated in sealed relationship against said perforations; maintaining fluid pressure within said casing to retain said plugging elements in sealed relationship with said perforations until said cement slurry has set; and drilling out any cement slurry which has set within said casing.

10. The method of claim 9 in which said perforation plugging elements are formed in the shape of balls.

11. The method of claim 9 in which said perforation plugging elements are balls having a density ranging from 1.0 to 1.2 times the density of the cement slurry.

12. The method of claim 9 in which said perforation plugging elements are rubber covered nylon balls having a density ranging from 1.0 to 1.2 times the density of the cement slurry.

References Cited in the file of this patent

UNITED STATES PATENTS

| 2,754,910 | Derrick et al. | July 17, 1956 |
| 2,779,417 | Clark et al. | Jan. 29, 1957 |

OTHER REFERENCES

Kastrop: Multi-Stage Fracturing, Petroleum Engineering, December 1956. Pages B–40 to 47.

Midland, West Texas Frac., Oil and Gas Journal, February 25, 1957. Pages 88 and 89.